United States Patent Office 3,144,338
Patented Aug. 11, 1964

3,144,338
METHOD OF MAKING YEAST-RAISED
BAKED PRODUCTS
Daniel B. Burke, Loudonville, N.Y., and Frederick M. Ketch, Battle Creek, Mich., assignors to General Foods Corporation, White Plains, N.Y., a corporation of Delaware
No Drawing. Filed Jan. 23, 1963, Ser. No. 253,299
5 Claims. (Cl. 99—90)

This invention relates to yeast-raised baked goods and, more specifically, to the manufacture of a bread mix.

Heretofore, the housewife desiring to bake a loaf of bread has followed a recipe duplicative of the dough-type procedure which the baker employs in the manufacture of bread or rolls. Unfortunately, this task proves difficult and often may require skills which the modern homemaker does not have to the extent required to match the baker's art. Accordingly, attempts have been made to furnish the housewife with a more convenient recipe which relies upon a less critical formulation involving the employment of a batter as distinguished from a dough-type system. The term "batter" in this respect refers to the creation of a hydrated farinaceous-shortening composition through the use of a whipping action instead of the kneading action typical to the baker's art. In this connection, it is understood that there are various procedures whereby the housewife may simply dissolve dry yeast in warm water and then add the conventional bread ingredients (flour, shortening, salt, sugar, milk and flavoring), which addition is followed by beating in a mechanical mixer, whereafter a final portion of flour is added and beating is continued by hand. However, this recipe calls for a separate measuring of ingredients and a sequence of steps, each of which introduces the possibility of an error in measurement or formulation.

It is an object of the present invention, therefore, to provide the housewife with a mix which can be employed in a batter-type recipe to make a yeast-leavened baked product through the use of a minimum of recipe steps.

Still another object of the invention is to provide a mix of the aforestated type which is free flowing, readily hydratable to a batter stage and more amenable to a single-addition of dry ingredients to the aqueous component of the batter.

The above objects are achieved by blending a farinacour flour ingredient, shortening, sugar, dry non-fat milk solids and salt through the use of suitable means which cause the shortening to be effectively distributed and plated throughout the farinaceous ingredient by melting said shortening to a sufficient extent during the blending operation while maintaining a blending temperature of below 110° F. during the plating operation in order to cover particles of the same in intimate mixture with the sugar, milk solids and salt.

In accordance with the preferred method of the present invention, all of the ingredients (except shortening and yeast) are dry blended in a premix. Solid shortening is then "cut" into the premix ingredients while the latter are tumbled and agitated, the shortening being thereby added in stages and caused to coat or plate a portion of the farinaceous ingredients (this cutting action being accompanied by balling of the shortening into small lumps which are distributed throughout the mix). This mixing operation is continued for a suitable period during which interval the lumps are broken into small particles and thoroughly redistributed throughout the mix. Following this premixing and blending operation the mix is "finished" by impacting or tempering the mix.

The finishing operation may be carried out under conditions which cause the particles of flour and the shortening and sugar aggregated therewith to be continually impacted, e.g., by an Entoleter or hammer mill. This impaction serves to achieve a free flowing, pulverulent, non-sticky consistency wherein the sugar, shortening and non-fat milk solids are so intimately and discretely dispersed throughout the flour that the finished mix gives no indication of the presence of these ingredients to the unaided eye.

To accomplish this finished state in the mix, the sugar (which may or may not have added thereto dried corn syrup solids or some other saccharide) is furnished in a sufficiently fine particulate state which will lend itself to intimate distribution in flour, shortening and non-fat milk solids. Generally, the sugar will have a particle size wherein 100% passes a No. 25 mesh U.S. standard sieve screen and not more than 10% is retained on a No. 100 mesh U.S. standard sieve screen. The dried non-fat milk solids are also reduced to a fine particulate state wherein not over 1% is retained on a No. 100 mesh U.S. standard sieve screen. The milk solids prior to drying are subjected to a suitably high temperature whereat the albuminous substances present are denatured to prevent degradation of gluten quality.

The farinaceous ingredient (the flour) may be derived fom any cereal grain and preferably has a protein content in excess of 12%, although the farinaceous ingredient may also be derived from other starch materials such as potatoes. The farinaceous ingredient should possess such gluten-forming characteristics as will furnish in the hydrated batter, which has been "rested" and proofed, the desired film-forming properties necessary to take advantage of the leavening action of yeast. In the case of potato flour or a low protein cereal flour it will be advantageous to add either a whole wheat flour or a hard wheat flour fraction high in protein. In general, the protein content of the farinaceous ingredient will range anywhere from 12% to 18% based upon the glutenous character of the protein present in the flour, protein being determined by Kjeldahl.

The "finishing" operation is such as to effectively distribute the shortening over the farinaceous ingredient in a manner whereby the mix is free flowing and batter preparation is accomplished effectively and with ease. The protein hydration or gluten development of the present mix is distinct from that which takes place in a dough-type bread. In the case of a dough-type bread the flour protein is hydrated only partially upon the initial addition of water. The achievement of adequate gluten strength to take advantage of the leavening action of yeast therefore calls for additional hydration of the protein, this increase being achieved through the vigorous kneading of the dough.

While the impacting method is preferred to achieve the most effective distribution of shortening for the purposes of this invention, it is understood that other methods may be used to liquefy and plate the shortening onto the flour and other ingredients. For example, the solid lumps of shortening which remain present during the blending operation when the shortening is added in solid form may be melted and more evenly distributed throughout the ingredients by elevating the temperature of the mix to 85°–110° F., preferably 90° F., during the blending operation, or by storage of the ingredients for several days at elevated temperatures (85°–110° F.) after completion of the normal blending operation. Temperatures above 110° F. and preferably above 100° F. should be avoided or the bread mix ingredients will be charred or degraded during the blending operation.

As an alternative to adding the shortening in solid form, the shortening may be added in a liquid or molten state during the blending operation by spraying the liquid or molten shortening onto the ingredients as they are blended. In this case also, the temperature of the ingredients as they are blended with the shortening should be kept below 100° F., and preferably below 100° F. The molten or liquid shortening is preferably added by spraying under high pressures, e.g., 500–1000 p.s.i.g. The temperature of the molten or liquid shortening as it is sprayed is in the range of 70°–120° F. although temperatures as high as 180° F. may be practiced. When using very high temperatures to melt or liquefy the shortening prior to spraying care should be taken to avoid raising the temperature of the bread mix ingredients to above 110° F. However, whether the shortening is added in a liquid, molten, or plastic state is not critical as long as the shortening will at some stage of the blending operation be liquefied to a sufficient extent to coat the farinaceous ingredient uniformly and be partially absorbed by the flour. The temperature of the shortening prior to addition to the bread mix ingredients is not critical, but once added to the ingredients for blending, temperatures of about 110° F. are to be avoided.

While the above plating technique is quite simple it is understood that a conventional agitation, tumbling, or blending operation will not achieve the desired objects of this invention. Therefore, the use of elevated temperatures and elevated pressures, or a combination of both of these elements at some stage of the blending operation is necessary. Regardless of the method used, the distribution of the shortening and the coating of the shortening onto the flour as well as the other bread mix ingredients, will be recognized as being completed when the mixture achieves a free flowing, homogeneous state which is almost completely free of any lumps of shortening.

It will be seen that for the batter-type system of the present invention, the protein hydration or gluten development attendant thereto is achieved by a less than ideal route such as is offered by the kneading operation of the baker. The complete development of a dough of a suitably glutenous character is dependent not only upon its degree of hydration but also upon the molecular orientation of the protein. In the kneading operation, this protein is afforded the maximum opportunity for this orientation. Unexpectedly, in accordance with the present invention, adequate gluten development is achieved with less work on the part of the housewife after the flour has been hydrated.

Through the finishing operation referred to hereinabove, the flour is provided in a more readily hydratable form. Thus, the housewife may add that quantity of water which will permit her to simply blend and heat her mix with the aqueous ingredients until a sticky, elastic batter is formed, in which medium the batter may simply be allowed to "rest" to initiate yeast fermentation and thereby cause the evolution of carbon dioxide gas and the formation of gas cells. The leavening agent, active dry yeast, is suspended in a suitable quantity of warm water of a temperature sufficient to activate the yeast. When the desired temperature is reached, the yeast cells divide and multiply incident to the fermentation process and are then in a condition to leaven a batter prepared from the finished mix ingredients.

In accordance with the present invention, the mix is simply added to this activated yeast medium and beaten for the required period of time to cause the uniform distribution of the yeast cells throughout the hydrated mix. In this connection, the dry non-fat milk solids need not be employed in the finished mix but rather their place may be taken by chilled, scalded milk which is added to the yeast dispersion or, alternatively, the yeast may be dissolved in scalded milk, to either of which liquid bodies the finished mix ingredients may be added.

Thus, the yeast-raised batter is developed by following the following series of steps:

(a) Activation of dried yeast in a suitable warm aqueous medium;

(b) Beating of the finished mix ingredients in the "yeast solution" until a sticky, elastic batter is formed;

(c) "Resting" of the batter for a suitable period at room temperature until well distributed gas cells are formed throughout the risen batter and the batter has about doubled in volume;

(d) Reformation of the cells to a uniform size through rebeating of the batter to reduce batter volume to approximately its original volume;

(e) Placement of the batter in a suitable pan, tin or mold;

(f) "Proofing" the batter to increase its volume to a point where, upon baking in the oven, the final result is a loaf, roll or other shape of suitable size and symmetry having evenly distributed small cells, thin cell walls and a soft crust; and (g) Baking the proofed dough in a suitable oven for the required period of time.

In general the proportion of flours, shortening, sugar and dried non-fat milk solids will usually range within the following weight percents:

| | |
|---|---|
| Flour | 75–85 |
| Shortening | 4.5–7.5 |
| Sugar | 4–12 |
| Dried non-fat milk solids | 3–6 |

The shortening will usually contain an emulsifier which may be any one of a variety of emulsifiers approved for use in bread and, typically, are emulsifiers such as polyethylene glycol and glycerol esters of higher fatty acids, fatty acid partial esters of sucrose, and phosphoric and sulphuric acid esters of polyhydroxy compounds. In general, the emulsifier should have suitable surface active properties such as will improve the shortening power of the shortening and result in a better crumb texture and crust. Also, such partially esterified polyhydroxy compounds have the effect of preventing starch retrogradation and in turn retain the freshness of baked goods. A suitable list of such emulsifiers which may be employed can be found in U.S. Patent No. 2,024,357 to Harris, issued December 17, 1935. The plastic shortening agent is principally made up of a hydrogenated fat or an oil such as cottonseed oil, peanut oil, lard, palm oil, olive oil, beef tallow and others.

The flour which is usually a cereal flour such as wheat, is preferably bleached to mature the flour through such agents as chlorine dioxide. Other bleaching agents such as benzoyl peroxide may be used to complete the maturing or bleaching of the pigmentation contained in the flour.

The sugars may include any of the commonly used sugars such as sucrose, dextrose, fructose, and levulose in the granulated or powered form.

In the case where impacting is employed to distribute the shortening, various types of mixers may be used in the premixing operation, e.g., a ribbon blender or a conventional dough mixer, so long as they provide an adequate distribution or dispersion of fat, sugar and flour for subsequent finishing. The apparatus used for achieving the finishing step generally is one which is capable of applying a plurality of successive impacts to the partially distributed shortening, flour and sugar, which impacts are sufficient to break up any lumps and reduce the mixture to such a particulate condition that it will be free flowing relatively dry and non-greasy to the touch, free of any tendency to ball-up in the hand and will retain its pulverulent character even when compressed in the palm of the hand using normal hand pressure. Through such means the flour is intended to have completely smeared thereon all of the available shortening material incorporated in the premix to the end that its presence is virtually indistinguishable as such in a free state. Any impact mill may be employed to achieve this distribution. Such means should be capable of applying a shearing force to the flour, shortening, sugar and any other powderous components in the mixture whereby they are caused to be intimately and homogeneously distributed with respect to one another and whereby the shortening is caused to smear the flour to a uniform degree. There are various forms of impacting apparatus which will perform this function included among which are Entoleters, Turbolizers, hammer mills, etc. When using non-impact means to achieve plating of the shortening, the same criteria as above would apply in determining the physical characteristics of the end product; however, care should be taken to avoid temperatures of above 110° F., and preferably not above 100° F. during the blending operation regardless of whether the shortening is added in a liquid, molten, plastic, or solid form.

In order to more fully understand the invention, it will now be described by specific examples.

*Example I*

| Ingredients: | Parts by weight |
|---|---|
| Hard wheat flour (S.W. winter wheat, 13% protein) | 80.8 |
| Finely granulated sugar | 6.4 |
| Dried non-fat milk solids | 4.4 |
| Sodium propionate | 0.1 |

The premix was made by blending the above-tabluated ingredients in a ribbon-type mixer. To the premix ingredients 5.8 parts hydrogenated cottonseed oil containing 7.5% monoglyceride composition was spaded in as mixing continued so as to distribute the shortening throughout the premix, the ribbon blender being continuously operated throughout this period. The time involved in this operation is approximately 5 minutes and as a result of "cutting-in" of shortening, the flour, sugar and shortening mixture has a number of lumps or discrete particles; the ribbon blender is operated for an additional three minutes to further break up the lumps.

From the ribbon mixer the composition is fed into an Entoleter wherein the premix ingredients in their partially distributed state are completely and homogeneously distributed with respect to one another so that they assume the free flowing, non-lumpy character specified hereinabove.

A batter bread is prepared from this mix by adding 7 parts by weight of active dry yeast to 300 parts by weight of water at a temperature of 110° F. in a mixing bowl. The yeast is stirred in the water for sufficient time to produce a suspension (in the neighborhood of about ½ minute). To this yeast solution is added 425 parts by weight of the fiinished mix. This mix is vigorously blended by hand for about one minute until a sticky consistency intermediate a batter and dough is achieved. This batter is allowed to "rest" for a period of 30 minutes in a bowl which is preferably covered by a damp cloth. After 30 minutes the batter is then stirred down and beaten for approximately 25 vigorous hand strokes during which time the cells produced by evolution of carbon dioxide from the leavening agent are transformed to a uniform size. The batter is then turned into a suitably sized bread pan using a spoon to completely remove the batter from the mixing bowl.

The batter is then proofed for a period of approximately 30 minutes at room temperature. Thereafter the proofed batter is baked in a preheated oven at 375° F. for 45–50 minutes. After baking the loaf of bread has a reddish brown crust, a symmetrical shape with good volume and uniform cell structure having thin walls and an over-all bread-like flavor and aroma.

*Example II*

A rye bread mix was prepared in accordance with the manner of Example I and baked into a batter bread in accordance with the recipes of Example I. This rye bread mix had the following ingredients and precent composition.

| Ingredients: | Parts by weight |
|---|---|
| Hard wheat flour (S.W. winter) | 60.6 |
| Rye flour (medium) | 20.6 |
| Shortening | 5.8 |
| Sugar (extra fine) | 4.7 |
| N.F. milk solids (Hi Temp) | 4.4 |
| Flour salt | 2.5 |
| Caraway seeds[1] | 1.0 |
| Caramel color | .3 |
| Sodium propionate | .1 |

[1] Caraway seeds are not included with ingredients blended in mixer, but should be fed into package with finished mix by means of a vibratory feeder.

*Example III*

An onion bread mix was prepared in accordance with the manner of Example I and baked into a batter bread in accordance with the recipes of Example I. This onion bread mix had the following ingredients and percent composition.

| Ingredients: | Parts by weight |
|---|---|
| Hard wheat flour (S.W. winter) | 78.55 |
| Sugar (extra fine) | 6.20 |
| Shortening | 5.80 |
| N.F. milk solids (Hi Temp) | 4.40 |
| Flour salt | 2.50 |
| Toasted minced onion[1] | 2.00 |
| Toasted powdered onion | .45 |
| Sodium propionate | .10 |

[1] Minced onion is not included with ingredients blended in mixer, but should be fed into package with finished mix by means of a vibratory feeder.

*Example IV*

A cinnamon-rasin bread mix was prepared in accordance with the manner of Example I and baked into a batter bread in accordance with the recipes of Example I. This cinnamon-rasin bread mix had the following ingredients and percent composition.

| Ingredients: | Parts by weight |
|---|---|
| Hard wheat flour (N.W. Spring) | 64.94 |
| Dusted Raisins[1] | 14.12 |
| Sugar (extra fine) | 10.47 |
| Shortening | 4.98 |
| N.F. milk solids (Hi Temp) | 3.77 |
| Flour salt | 0.95 |
| Cinnamon (Saigon) | 0.69 |
| Sodium propionate | 0.08 |

[1] Dusted raisins are not included with ingredients blended in mixer, but should be fed into package with finished mix by means of a vibratory feeder.

*Example V*

A whole wheat breat mix was prepared in accordance with the manner of Example I and baked into a batter bread in accordance with the recipes of Example I. This whole wheat bread mix had the following ingredients and percent composition.

| Ingredients: | Parts by weight |
|---|---|
| Whole wheat flour | 46.0 |
| Hard wheat flour (S.W. winter) | 34.8 |
| Sugar (extra fine) | 6.4 |
| Shortening | 5.8 |
| N.F. milk solids (Hi Temp) | 4.4 |
| Flour salt | 2.5 |
| Sodium propionate | 0.1 |

*Example VI*

A premix was made, as in Example I, by blending the tabulated ingredients in a ribbon-type mixer. Then 5.8 parts of the shortening composition described in Example I was held at room temperature until the shortening achieved a product temperature of 70°–75° F. and was semi-liquid in consistenecy. The shortening was added to the premix during continued operation of the mixer by pumping the semi-liquid shortening at 500–600 p.s.i.g. through spray nozzles located inside the mixer over a period of two minutes. After spraying of the shortening in to the premix, the mixture is further blended by operating the ribbon blender for an additional 3 minutes to assure a free flowing, non-lumpy character in the final mixture. The procedure of Example I was then followed to produce a baked bread similar to that of Example I.

*Example VII*

A premix was made, as in Example I, by blending the tabulated ingredients in a ribbon mixer and then adding 5.8 parts of the shortening composition described in Example I, after heating the shortening to a product temperature of 110°–120° F. The shortening was added by pumping it through nozzles located inside the mixer at a spraying pressure of 300–400 p.s.i.g. over a period of about 2 minutes. The ribbon blender was then operated for an additional 3 minutes to assure a free flowing and lump free bread mix. The procedure of Example I was then followed to produce a baked bread similar to that of Example I.

*Example VIII*

The procedure of Example I was followed with the exception that an Entoleter was not used to distribute the solid shortening after the blending operation. The premix ingredients (with the partially distributed shortening) was stored for a week at an elevated temperature of 85°–95° F. to further distribute the shortening throughout the mix and achieve a final bread mix which was more free flowing and substantially free of any large lumps. The recipe of Example I was then followed to produce a baked bread similar to that of Example I.

Thus, a series of bread mixes have been described which have been manufactured and baked in accordance with the present invention. Advantageously, all of these mixes share in the advantage of more rapid hydration of the mix due to the ability to employ a greater percentage of water relative to the dry materials. This induces more rapid hydration and thus requires less physical exertion to prepare a batter capable of being baked to an acceptable loaf. This stems from greater availability of water to protein and thus greater ease and less physical effort to achieve the required degree of molecular orientation of the gluten developed through hydration. By reason of the convenience offered through a batter mix of this type, the housewife is spared the task of kneading, rolling and forming the dough, her task being reduced to a simple operation of transferring the batter from the mixing bowl to a baking pan. Collateral to ease in preparing the bread components in a batter system, as distinguished from a dough system, is the more rapid fermentation resulting in shorter resting and proofing times that is required for the conventional dough-type baked breads.

This application is a continuation-in-part of copending application, Serial No. 65,963, filed October 31, 1960, now abandoned.

While the present invention has been described with particular reference to specific examples, it is not to be limited thereby, but reference is to be had to the appended claims for a definition of its scope.

What is claimed is:
1. The method of making yeast-raised baked goods which comprises:
   (a) preparing an intimate and homogenous distribution of plastic shortening and sugar with a milled flour having at least 12% protein, the flour being present at a level of 75–85% by weight, the shortening being employed at a level of 4.5 to 7.5% by weight and the sugar being employed at a level of 4–12% by weight; the shortening being distributed uniformly over the flour by melting said shortening to a sufficient extent during the blending operation while maintaining the temperature of the mix being blended at below 110° F. to cause the shortening to be plated onto said flour so that the finished mix can be gripped under normal hand pressure but will crumble to its original consistency upon release of such pressure, said composition also containing about 3–6% dry non-fat milk solids by weight of the flour;
   (b) creating an active aqueous yeast solution;
   (c) beating all of the finished mix ingredients at once in the yeast solution until a sticky elastic batter is formed;
   (d) resting the batter until gas cells are formed throughout by the activity of the yeast;
   (e) beating the batter to reduce the volume thereof to approximately its original volume and reform the cells thereof to a uniform size;
   (f) proofing the batter to allow it to rise to a volume suitable for production of small thin cells and a soft crust upon baking; and
   (g) baking the proofed batter.

2. The procedure of claim 1 wherein the shortening is mixed with the ingredients in solid form and plated onto the flour by the use of impaction during the blending operation, said impaction causing particulation and melting of the solid shortening during blending.

3. The procedure of claim 1 wherein the shortening is mixed with the ingredients in solid form and plated onto the flour by tempering the mix to 80°–110° F. during the blending operation.

4. The procedure of claim 1 wherein the shortening is mixed with the ingredients in liquid form and plated onto the flour by spraying the liquid shortening under pressure onto the ingredients during the blending operation.

5. The procedure of claim 1 wherein the shortening is mixed with the ingredients in plastic form and plated onto the flour by spraying the plastic shortening onto the ingredients during the blending operation.

References Cited in the file of this patent
UNITED STATES PATENTS
3,066,029    Jeffreys _____ Nov. 27, 1962